(12) United States Patent
Oka et al.

(10) Patent No.: US 10,446,304 B2
(45) Date of Patent: Oct. 15, 2019

(54) RESISTOR TRIMMING METHOD

(71) Applicant: KOA Corporation, Ina-shi, Nagano (JP)

(72) Inventors: Naoto Oka, Ina (JP); Homare Sasaki, Ina (JP)

(73) Assignee: KOA Corporation, Ina-shi (JP)

( * ) Notice: Subject to any disclaimer, the term of this patent is extended or adjusted under 35 U.S.C. 154(b) by 103 days.

(21) Appl. No.: 15/516,025

(22) PCT Filed: Jul. 22, 2015

(86) PCT No.: PCT/JP2015/070868
§ 371 (c)(1),
(2) Date: Mar. 31, 2017

(87) PCT Pub. No.: WO2016/051939
PCT Pub. Date: Apr. 7, 2016

(65) Prior Publication Data
US 2017/0301439 A1 Oct. 19, 2017

(30) Foreign Application Priority Data
Oct. 3, 2014 (JP) ................. 2014-205118

(51) Int. Cl.
*B23K 26/00* (2014.01)
*B23K 26/08* (2014.01)
(Continued)

(52) U.S. Cl.
CPC ......... *H01C 17/242* (2013.01); *B23K 26/351* (2015.10); *H01C 17/006* (2013.01)

(58) Field of Classification Search
CPC .... B23K 26/34; B23K 26/346; B23K 26/351; B23K 26/352; B23K 26/354;
(Continued)

(56) References Cited

U.S. PATENT DOCUMENTS

| 4,146,673 A | 3/1979 | Headley |
| 4,429,298 A * | 1/1984 | Oberholzer ............ H01C 17/24 29/620 |

(Continued)

FOREIGN PATENT DOCUMENTS

| CN | 1252887 A | 5/2000 |
| CN | 106104710 A | 11/2016 |

(Continued)

OTHER PUBLICATIONS

English Translation for JP 2001-307912 (Year: 2001).*
(Continued)

*Primary Examiner* — Sang Y Paik
(74) *Attorney, Agent, or Firm* — Crowell & Moring LLP

(57) ABSTRACT

The invention is to provide a resistor trimming method capable of adjusting a resistance value with ultrahigh precision and having excellent production efficiency. To achieve the object, a start point (S1) at a distance from a resistor (4) is irradiated with laser light while probes are brought into contact with a pair of surface electrodes (3) to measure a resistance value of the resistor (4). The place irradiated with the laser light is scanned so that a first trimming groove (5) extending in a direction perpendicular to a current direction can be formed in the resistor (4). Then, the place irradiated with the laser light is returned by a predetermined amount from an end point (first turning point (T1)) of the first trimming groove (5) to be set as a second turning point (T2). With the second turning point (T2) as a start point, scanning and cutting is performed to form a second trimming groove (6). Thus, the resistance value of the resistor (4) is adjusted to a target resistance value with high precision.

1 Claim, 6 Drawing Sheets

(51) Int. Cl.
*H01C 17/242* (2006.01)
*B23K 26/351* (2014.01)
*H01C 17/00* (2006.01)

(58) Field of Classification Search
CPC .... B23K 26/355; B23K 26/36; B23K 26/361; B23K 26/364; H01C 17/006; H01C 17/22; H01C 17/24; H01C 17/242
USPC .......................... 219/121.6–121.83, 542–548
See application file for complete search history.

(56) References Cited

U.S. PATENT DOCUMENTS

| | | | |
|---|---|---|---|
| 6,348,392 | B1 | 2/2002 | Nakayama et al. |
| 6,462,304 | B2 * | 10/2002 | Kaida ................... H01C 17/242 219/121.69 |
| 2017/0084364 | A1 | 3/2017 | Matsumoto |

FOREIGN PATENT DOCUMENTS

| | | |
|---|---|---|
| JP | 61-112304 A | 5/1986 |
| JP | 61-144602 U | 9/1986 |
| JP | 63-13361 A | 1/1988 |
| JP | 63-149503 U | 10/1988 |
| JP | 4-168702 A | 6/1992 |
| JP | 2001-93710 A | 4/2001 |
| JP | 2001-307912 A | 11/2001 |
| JP | 2003-31405 A | 1/2003 |

OTHER PUBLICATIONS

Chinese-language Office Action issued in counterpart Chinese Application No. 201580053469.4 dated Apr. 25, 2018 (five (5) pages).
International Search Report (PCT/ISA/210) issued in PCT Application No. PCT/JP2015/070868 dated Oct. 6, 2015 with English translation (Four (4) pages).
Japanese-language Written Opinion (PCT/ISA/237) issued in PCT Application No. PCT/JP2015/070868 dated Oct. 6, 2015 (Three (3) pages).

* cited by examiner

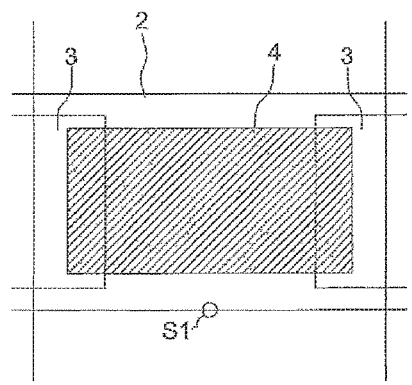
Fig. 2A
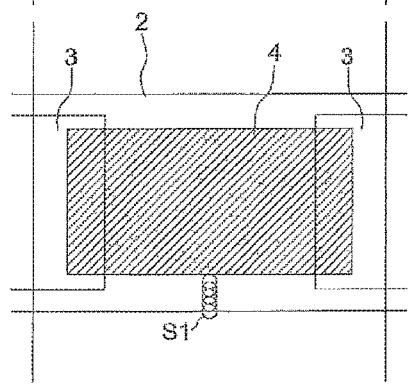
Fig. 2B
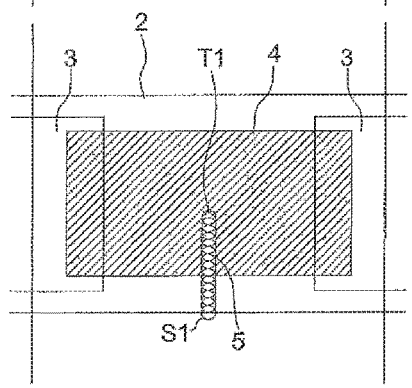
Fig. 2C
Fig. 2D
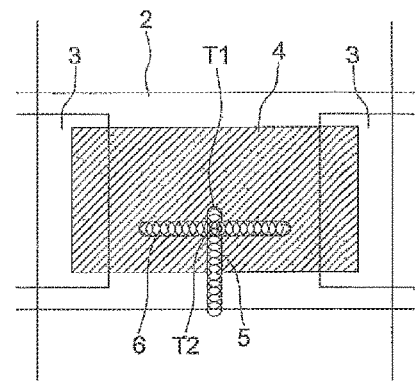
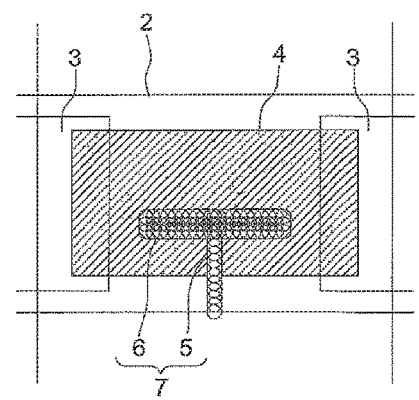
Fig. 2E
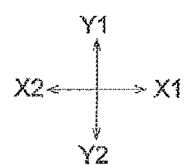

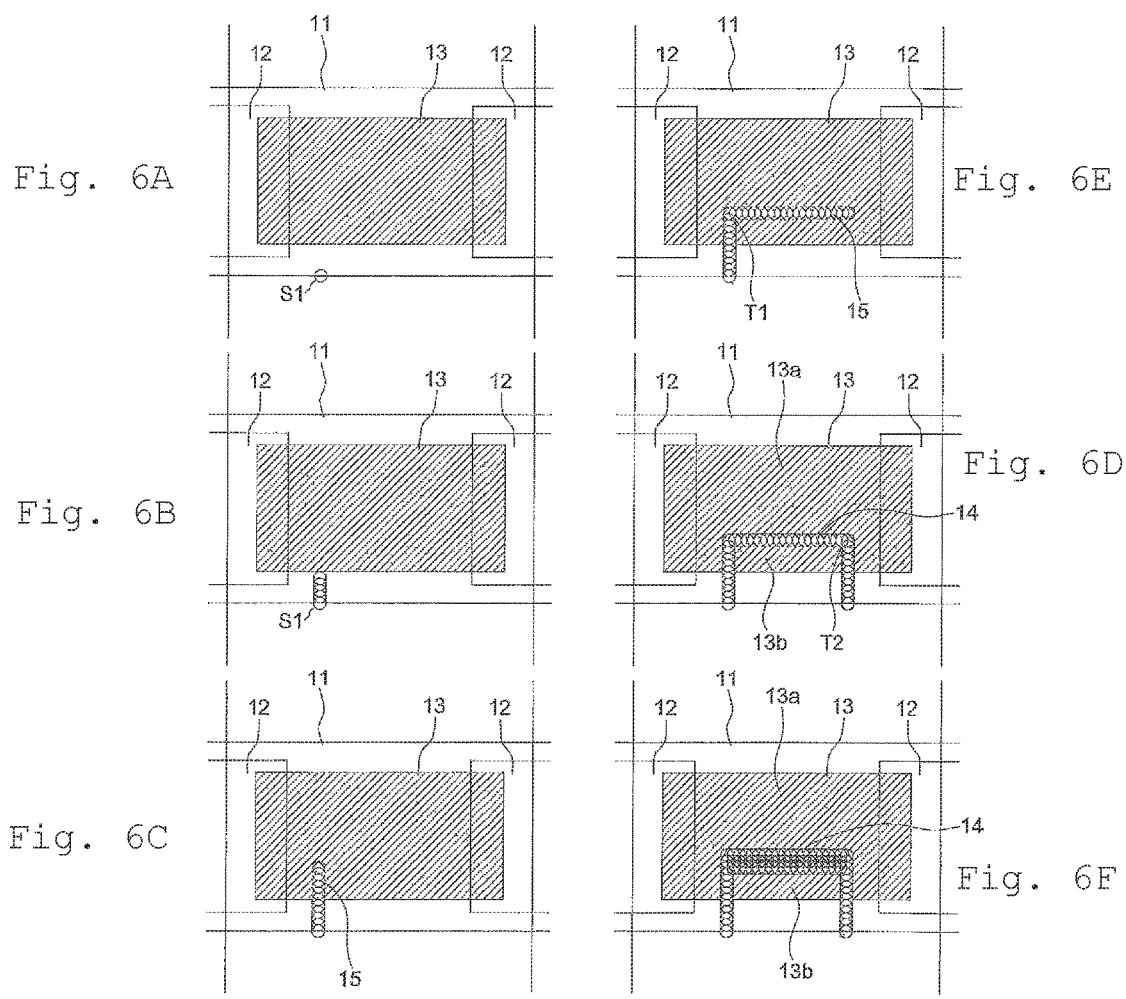

RESISTOR TRIMMING METHOD

TECHNICAL FIELD

The present invention relates to a resistor trimming method for irradiating a resistor with laser light to form a trimming groove in the resistor to thereby adjust a resistance value of the resistor.

BACKGROUND ART

A chip resistor is mainly constituted by a cuboid-shaped insulating substrate, a pair of front electrodes, a pair of back electrodes, end surface electrodes, a resistor, a protective layer, etc. The pair of front electrodes are disposed on a front surface of the insulating substrate and face each other with a predetermined interval therebetween. The pair of back electrodes are disposed on a back surface of the insulating substrate and face each other with a predetermined interval therebetween. The end surface electrodes bridge the front electrodes and the back electrodes respectively. The resistor bridges the front electrodes paired with each other. The protective layer covers the resistor.

Generally, such a chip resistor is produced in the following manner. That is, electrodes, resistors, protective layers, etc. as many as a large number of chip resistors are formed collectively on a large-sized aggregate substrate. Then, the aggregate substrate is divided along division lines (e.g. division grooves) arranged into a latticed pattern so that the large number of chip resistors can be obtained. In such a chip resistor producing process, a resistive paste is printed and sintered on one surface of the aggregate substrate to thereby form the large number of the resistors. However, due to the influence of positional displacement or blurring during the printing or temperature unevenness in a sintering furnace etc., it is difficult to avoid generation of some variation in size or film thickness among the resistors. For this reason, it is necessary to perform resistance value adjustment work for forming a trimming groove in each resistor in the state of the aggregate substrate so as to set a resistance value of the resistor at a desired one. The trimming groove is a slit formed by irradiation with laser light. As to the shape of the slit, a trimming method called "L-cutting" or "straight cutting" is the mainstream. However, a chip resistor using a trimming method called "scanning and cutting" in order to obtain a resistance value with ultrahigh precision has been also proposed (e.g. see Patent Literature 1).

FIG. 5 is a plan view of a chip resistor 10 disclosed in the aforementioned Patent Literature 1. The chip resistor 10 is provided with a pair of front electrodes 12, a resistor 13, etc. The pair of front electrodes 12 are disposed on an insulating substrate 11 and face each other with a predetermined interval therebetween. The resistor 13 shaped like a rectangle bridges the front electrodes 12. An inverted U-shaped trimming groove 14 is formed in the resistor 13. A resistance value of the chip resistor 10 is regulated by the resistor 13 in which the trimming groove 14 has been formed. By the trimming groove 14, the resistor 13 is divided into two, i.e. a body portion 13a and a cut-out portion 13b. A procedure for forming the trimming groove 14 having such a shape will be described below based on FIG. 6.

First, as shown in FIG. 6(a), a place (start point) S1 at a distance from the resistor 13 on the insulating substrate 11 is irradiated with laser light, while measurement terminals (probes) are brought into contact with the pair of front electrodes 12 to measure a resistance value of the resistor 13. On this occasion, the start point S1 is set at a place slightly distant from the resistor 13, for example, an intermediate portion (on a division line in FIG. 6) between the resistor 13 and another adjacent resistor 13 in order to prevent the resistor 13 from being damaged unwillingly due to positional displacement. As shown in FIG. 6(b), the place irradiated with the laser light is scanned right upward in FIG. 6(b) from the start point S1 toward one side surface of the resistor 13. Then, as shown in FIG. 6(c), the place irradiated with the laser light is extended to the inside of the resistor 13 as it is. Thus, a slit 15 shaped like a straight line perpendicular to a current direction is formed. The resistance value of the resistor 13 increases gradually due to the slit 15. After the resistance value is increased until the measured resistance value is lower than a target resistance value by a certain degree, the direction of the slit 15 is changed by 90° C. at a first turning point T1 so that the slit 15 can be extended in a parallel direction to the current direction, as shown in FIG. 6(d). Thus, the resistance value is further increased. Then, as shown in FIG. 6(e), the direction of the slit 15 is changed by 90° at a second turning point T2 and moved downward to thereby form an inverted U-shaped trimming grove 14. Thus, the resistor 13 is divided into two, i.e. a body portion 13a and a cut-out portion 13b. At this point of time, the resistance value of the resistor 13 is adjusted to a value (about −1% to −5%) slightly lower than the target resistance value. Next, laser light is applied to the body portion 13a side of the trimming groove 14 to gradually cut (scan and cut) the body portion 13a, as shown in FIG. 6(f). Thus, the resistance value of the resistor 13 is adjusted relatively to the target resistance value with extremely high precision.

According to such a trimming method, the cut-out portion 13b trimmed into an inverted U-shape is provided in a portion of the resistor 13 to thereby roughly adjust the resistance value. Therefore, a time required for the rough adjustment of the resistance value can be shortened. In addition, the inverted U-shaped slit is scanned and cut gradually linearly to be widened. Thus, the roughly adjusted resistance value is finely adjusted. Accordingly, the resistance value of the resistor 13 can be adjusted rapidly and precisely.

CITATION LIST

Patent Literature

Patent Literature 1: JP-A-4-168702

SUMMARY OF INVENTION

Technical Problem

In the background-art trimming method disclosed in Patent Literature 1, the inverted U-shaped slit is formed in the resistor. In this manner, the resistance value is roughly adjusted to a value (about −1% to −5%) slightly lower than the target resistance value. Then, the slit is scanned and cut to be widened. In this manner, the resistance value is finely adjusted to agree with the target resistance value. Therefore, when trimming is performed to extend the slit in the direction perpendicular to the current direction from the one side surface of the resistor, it is necessary to change the direction of the slit at the first turning point T1 after trimming is performed to increase the resistance value up to about −10% with reference to the target resistance value in consideration of a change amount (increase amount) of the resistance value caused by the slit after the first turning point T1.

Accordingly, when the resistance value (initial resistance value) prior to formation of the trimming groove is lower than −10% with reference to the target resistance value (e.g. −20%), trimming can be performed to form the inverted U-shaped slit in the resistor to roughly adjust the resistance value up to about −1% to −5%. Then, the slit can be scanned and cut to thereby adjust the resistance value with ultrahigh precision.

However, since resistors as many as a large number of chip resistors are formed collectively on a large-sized aggregate substrate, the initial resistance values of all the resistors are not always lower than −10% with reference to the target resistance value. Due to a variation in printing conditions, sintering conditions, etc. among the resistors, the initial resistance values of some of the resistors on the aggregate substrate may be higher than −10% with reference to the target resistance value. In the case in which the resistance value of such a resistor is adjusted, the first turning point T1 coincides with the start point S1. As shown in FIG. 7(a), an inverted U-shaped slit is not formed in the resistor but scanning and cutting is started suddenly at the start point S1. Accordingly, a substrate portion from which the resistor is absent is also scanned as shown in FIG. 7(b), and a scanning and cutting time required for trimming the resistor therefore becomes very long. Accordingly, when even one resistor like this is present on the substrate, a standby time until a next step becomes longer in the aggregate substrate as a whole although the other resistors can be trimmed rapidly. Therefore, there arises a problem that production efficiency may be deteriorated.

The invention has been accomplished in consideration of the actual circumstances of such a background-art technique. An object of the invention is to provide a resistor trimming method capable of adjusting a resistance value with ultrahigh precision and having excellent production efficiency.

Solution to Problem

In order to achieve the aforementioned object, the invention provides a resistor trimming method for irradiating a resistor of a chip resistor with laser light to form a trimming groove in the resistor to thereby adjust a resistance value of the resistor, the chip resistor including an insulating substrate, a pair of front electrodes provided on a front surface of the insulating substrate, and the resistor connected to the pair of front electrodes, wherein: after the laser light is applied linearly from one side surface of the resistor which is not connected to the front electrodes toward an opposite side surface of the resistor to form a first trimming groove, a place returning by a predetermined amount from an end point of the first trimming groove is used as a start point to perform scanning with the laser light radiated in a direction intersecting with the first trimming groove to thereby form a wide second trimming groove including at least the end point of the first trimming groove.

In such a resistor trimming method, scanning and cutting is started at the place returning by the predetermined amount from the endpoint of the first trimming groove, and the place is a portion small in change amount of the resistance value in an interelectrode direction. Accordingly, an increase amount of the resistance value after a turning point regulating the end point of the first trimming groove can be suppressed relatively to a measured resistance value at the turning point. Therefore, the resistance value at the turning point can be made close to the resistance value (e.g. about −1% to −5% with reference to the target resistance value) at the start point of the scanning and cutting. Accordingly, even when the initial resistance value prior to start of the trimming is relatively high (e.g. about −7% with reference to the target resistance value), scanning and cutting can be suppressed from starting suddenly, and production efficiency can be made excellent while the resistance value can be adjusted with ultrahigh precision by scanning and cutting.

Advantageous Effects of Invention

In the resistor trimming method according to the invention, the resistor can be scanned and cut to adjust the resistance value with ultrahigh precision. In addition, a processing time required for the scanning and cutting can be prevented from being longer so that production efficiency can be improved.

BRIEF DESCRIPTION OF DRAWINGS

FIGS. 2A-2E Explanatory views showing the trimming method according to the first embodiment.

FIGS. 6A-6F Explanatory views showing the trimming method according to the background-art example.

DESCRIPTION OF EMBODIMENTS

Figure 1:
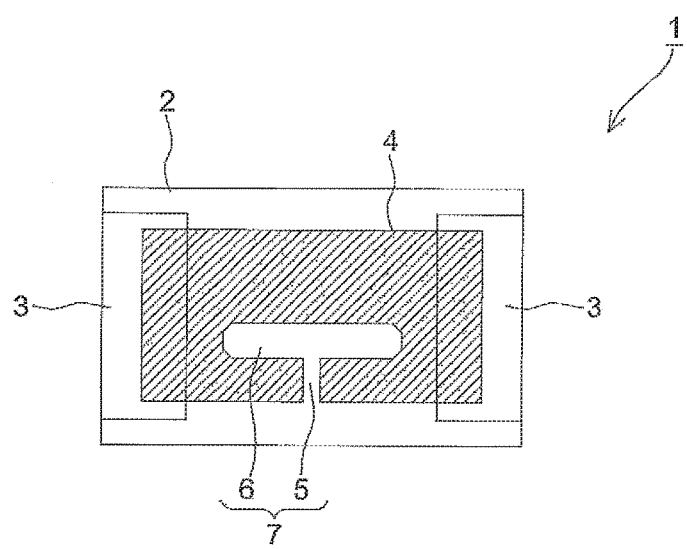
FIG. 1 A plan view of a chip resistor to which a trimming method according to a first embodiment of the invention is applied.

Embodiments of the invention will be described with reference to the drawings. As shown in FIG. 1, a chip resistor 1 to which a trimming method according to a first embodiment of the invention is applied is mainly constituted by a cuboid-shaped insulating substrate 2, a pair of front electrodes 3, a rectangular resistor 4, a not-shown protective layer, etc. The pair of front electrodes 3 are provided on longitudinally opposite end portions of a front surface of the insulating substrate 2. The resistor 4 is connected to the pair of front electrodes 3. The protective layer covers the resistor 4. A T-shaped trimming groove 7 consisting of a first trimming groove 5 and a second trimming groove 6 is formed in the resistor 4. A resistance value of the resistor 4 is adjusted by the trimming groove 7. Incidentally, although not shown, a pair of back electrodes are provided on a back surface of the insulating substrate 2 correspondingly to the front electrodes 3. End surface electrodes bridging the front electrodes and the back electrodes correspondingly and respectively are provided on longitudinally opposite end surfaces of the insulating substrate 2.

The insulating substrate 2 is made of ceramics etc. When a large-sized aggregate substrate which will be described later is divided along primary division grooves and secondary division grooves which extend vertically and horizontally, a large number of the insulating substrates 2 can be obtained. The pair of front electrodes 3 are obtained by screen-printing, drying and sintering an Ag paste. The resistor 4 is obtained by screen-printing, drying and sintering a resistor paste of ruthenium oxide etc.

The first trimming groove 5 is a narrow slit which extends linearly and upward from one side surface (lower side in FIG. 1) of the resistor 4. The extension direction of the first trimming groove 5 is perpendicular to a current direction flowing in the resistor 4. The second trimming groove 6 is a wide slit which extends in a parallel direction to the current direction. An end point of the first trimming groove 5 is positioned in the inside of the second trimming groove 6. Although details will be described later, the resistor 4 is cut straight to thereby form the first trimming groove 5, and a region including a front end portion of the first trimming groove 5 is scanned and cut to thereby form the second trimming groove 6.

Next, a trimming method in the chip resistor 1 configured as described above will be described with reference to FIG. 2. Incidentally, although only the insulating substrate 2 corresponding to one chip is shown in FIG. 2, a large number of chip resistors 1 are actually produced collectively. Therefore, chip formation regions as many as the large number of chip resistors are provided in an aggregate substrate for obtaining the large number of chip resistors. In addition, in FIG. 2, arrows X1-X2 designate the current direction (i.e. an interelectrode direction) flowing in the resistor 4 and arrows Y1-Y2 designate the direction perpendicular to the current direction.

First, as shown in FIG. 2(*a*), a place (start point) S1 at a distance from the resistor 4 on the insulating substrate 2 is irradiated with laser light while measurement terminals (probes) are brought into contact with the pair of front electrodes 3 to measure the resistance value of the resistor 4. As shown in FIG. 2(*b*), the place irradiated with the laser light is scanned right upward (in a Y1 direction) in FIG. 2(*b*) from the start point S1 toward one side surface of the resistor 4. Then, as shown in FIG. 2(*c*), the place irradiated with the laser light is extended to the inside of the resistor 4 as it is. Thus, the first trimming groove 5 shaped like a straight line perpendicular to the current direction is formed. Incidentally, although not shown, the resistor 4 is covered with an undercoat layer (protective layer) and the first trimming groove 5 is formed by the laser light applied to the resistor 4 through the undercoat layer.

Due to the first trimming groove 5 extended in the Y1 direction, the resistance value of the resistor 4 increases gradually. After the resistance value is increased to a value (e.g. about −7%) lower than a target resistance value by a certain degree, an endpoint (front end) of the first trimming groove 5 is set as a first turning point T1 and the place irradiated with the laser light is returned by a predetermined amount from the first turning point T1 in a direction (Y2 direction) toward the start point S1.

As shown in FIG. 2(*d*), the direction of scanning with the laser light is changed by 90° at the returned place set as a second turning point T2 to thereby form a second trimming groove 6 extending in a direction (X1-X2 direction) perpendicular to the first trimming groove 5. Then, scanning and cutting is performed to widen a slit width of the second trimming groove 6 in the Y1 direction. Thus, as shown in FIG. 2(*e*), the wide second trimming groove 6 which covers the end point (first turning point T1) of the first trimming groove 5 is formed. When the irradiation with the laser light is stopped at a point of time when the resistance value is increased to agree with the target resistance value, the T-shaped trimming groove 7 is formed in the resistor 4. Thus, the trimming process is completed.

Here, the second turning point T2 is a place returning by a predetermined amount from the end point (first turning point T1) of the first trimming groove 5 in a direction toward the start point S1. The place is a portion which is small in change amount of the resistance value in the interelectrode direction. Accordingly, the end point of the first trimming groove 5 does not have to be set at about −10% with reference to the target resistance value as in the background art, but the trimming of the first trimming groove 5 can be completed at a point of time when the measured resistance value increases up to a value higher than −10%, e.g. up to about −7% with reference to the target resistance value so that the process can be shifted to the scanning and cutting of the second trimming groove 6. Accordingly, even when the initial resistance value prior to start of the trimming is comparatively high, the scanning and cutting can be suppressed from starting suddenly, and production efficiency can be made excellent while the resistance value can be adjusted with ultrahigh precision by scanning and cutting.

Incidentally, after such a trimming process (resistance value adjustment work) is performed on all the resistors 4 on the aggregate substrate, a resin paste such as an epoxy resin-based paste is screen-printed and thermally cured so as to cover the aforementioned undercoat layer, the resistor 4 and the trimming groove 7, etc. Thus, an overcoat layer is formed so that the protective layer can be formed to have a two-layer structure. Next, the aggregate substrate is divided primarily to obtain strip-shaped substrates. Then, end surface electrodes are formed on divided surfaces of the strip-shaped substrates to bridge the front electrodes 3 and the back electrodes respectively. Then, the strip-shaped substrates are secondarily divided so that a large number of chip resistors 1 shown in FIG. 1 can be obtained.

As described above, in the resistor trimming method according to the first embodiment of the invention, the scanning and cutting of the second trimming groove 6 is started at the place (second turning point T2) returning by the predetermined amount from the end point (first turning point T1) of the first trimming groove 5, and the place is a portion small in change amount of the resistance value in the interelectrode direction. Accordingly, an increase amount of the resistance value after the turning point T1 regulating the end point of the first trimming groove 5 can be suppressed relatively to a measured resistance value at the turning point. Therefore, the resistance value at the turning point can be made close to the resistance value (e.g. about −1% to −5% with reference to the target resistance value) at the start point of the scanning and cutting. Accordingly, even when the initial resistance value prior to start of the trimming is relatively high (e.g. about −7% with reference to the target resistance value), scanning and cutting can be suppressed from starting suddenly, and production efficiency can be made excellent while the resistance value can be adjusted with ultrahigh precision by scanning and cutting. Moreover, irradiation with the laser light can be performed continuously from the straight cutting of the first trimming groove 5 to the scanning and cutting of the second trimming groove 6. Therefore, a processing time required for formation of the trimming groove 7 can be shortened also from this point of view.

Incidentally, in the aforementioned first embodiment, description has been made about the trimming method in which the place returning by the predetermined amount from the end point of the first trimming groove 5 is used as the start point to perform scanning and cutting to extend the second trimming groove 6 in the perpendicular direction to the first trimming groove 5 to thereby form the trimming groove 7 which is T-shaped as a whole. However, the entire shape of the first trimming groove 5 and the second trimming groove 6 constituting the trimming groove 7 does not have to be always T-shaped.

Figure 3:
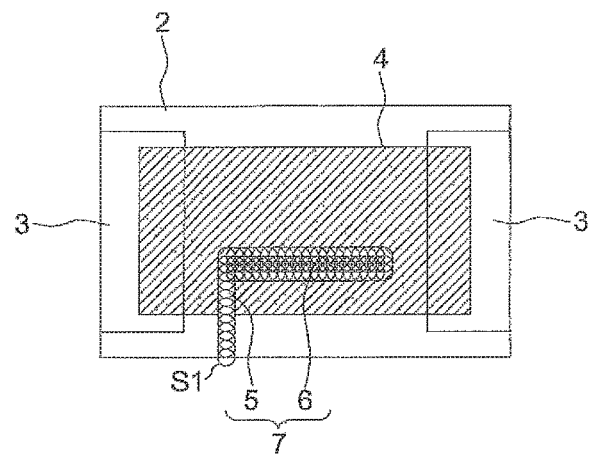
FIG. 3 An explanatory view showing a trimming method according to a second embodiment of the invention.
Figure 4:
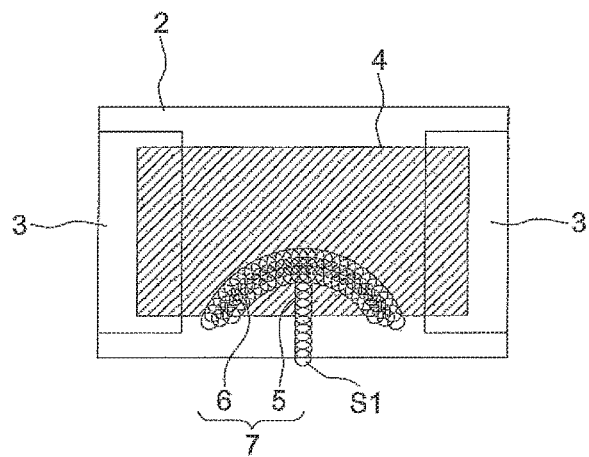
FIG. 4 An explanatory view showing a trimming method according to a third embodiment of the invention.
Figure 5:
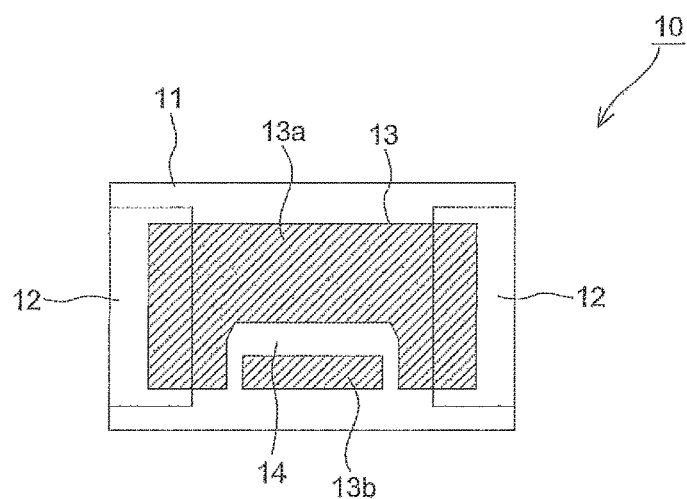
FIG. 5 A plan view of a chip resistor to which a trimming method according to a background-art example is applied.
Figure 7A:
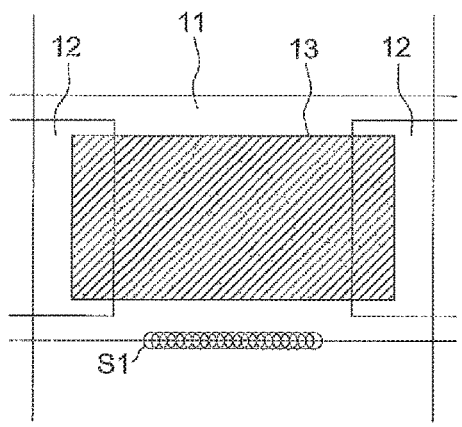
FIGS. 7A and 7B Explanatory views showing a problem inherent in the background-art example.
Figure 7B:
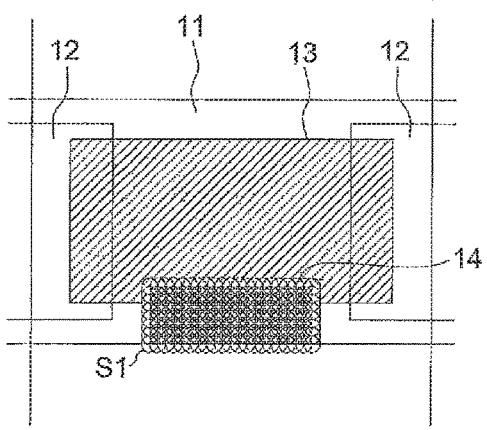

For example, as in a second embodiment shown in FIG. 3, a trimming groove 7 which is L-shaped as a whole may be formed in such a manner that a place returning by a predetermined amount from an end point of a first trimming groove 5 is used as a start point to perform scanning and cutting to forma second trimming groove 6 in an illustrated region on a right side of the first trimming groove 5. Alternatively, as in a third embodiment shown in FIG. 4, a trimming groove 7 may be formed in such a manner that a place returning by a predetermined amount from an end point of a first trimming groove 5 is used as a start point to perform scanning and cutting to forma second trimming groove 6 into a circular arc shape.

REFERENCE SIGNS LIST

1 chip resistor
2 insulating substrate
3 front electrode
4 resistor
5 first trimming groove
6 second trimming groove
7 trimming groove
S1 start point
T1 first turning point
T2 second turning point

The invention claimed is:

1. A resistor trimming method for irradiating a resistor of a chip resistor with laser light to form a trimming groove in the resistor to thereby adjust a resistance value of the resistor, the chip resistor including an insulating substrate, a pair of front electrodes provided on a front surface of the insulating substrate, and the resistor connected to the pair of front electrodes, wherein:

after the laser light is applied linearly from one side surface of the resistor which is not connected to the front electrodes toward an opposite side surface of the resistor to form a first trimming groove, scan cutting is performed with the laser light, beginning at a point located a predetermined amount from an end point of the first trimming groove and intersecting the first trimming groove so as to extend in a direction toward the end point of the first trimming groove to thereby form a wide second trimming groove including at least the entire end point of the first trimming groove.

* * * * *